United States Patent [19]

Habel, Jr. et al.

[11] Patent Number: 4,679,678
[45] Date of Patent: Jul. 14, 1987

[54] MINIMUM COMPLEXITY VIBRATION DAMPER

[75] Inventors: Paul A. Habel, Jr.; Elaine S. Kulczycki, both of Troy, Mich.

[73] Assignee: Borg-Warner Corporation, Chicago, Ill.

[21] Appl. No.: 773,691

[22] Filed: Sep. 9, 1985

Related U.S. Application Data

[62] Division of Ser. No. 564,151, Dec. 22, 1983, Pat. No. 4,555,009.

[51] Int. Cl.$^4$ ............................ F16D 3/14; F16D 3/66
[52] U.S. Cl. ..................................... 192/106.2; 464/67
[58] Field of Search .............. 192/106.1, 106.2, 70.17, 192/3.28, 3.29; 464/66, 67

[56] References Cited

U.S. PATENT DOCUMENTS

| | | | |
|---|---|---|---|
| 480,439 | 8/1892 | Seaton | 464/66 |
| 2,076,373 | 4/1937 | Katcher | 192/68 |
| 2,115,819 | 5/1938 | Lewis | 464/66 X |
| 2,158,244 | 5/1939 | Mistretta et al. | 464/66 X |
| 2,276,416 | 3/1942 | Nutt | 192/106.2 |
| 3,799,309 | 3/1974 | Cook | 192/106.2 |
| 4,088,212 | 5/1978 | Brown | 192/106.2 |
| 4,185,728 | 1/1980 | Gatewood | 192/106.2 |
| 4,304,107 | 12/1981 | Fall et al. | 192/106.1 X |
| 4,354,586 | 10/1982 | Stanley | 192/106.2 |
| 4,406,357 | 9/1983 | Nagano et al. | 192/106.2 |
| 4,440,283 | 4/1984 | Nioloux | 192/106.1 |
| 4,446,955 | 5/1984 | Lech, Jr. | 192/106.1 |
| 4,465,172 | 8/1984 | Gatewood | 192/70.17 |
| 4,496,036 | 1/1985 | Loizeau | 192/70.17 |

Primary Examiner—Rodney H. Bonck
Assistant Examiner—Richard M. Lorence
Attorney, Agent, or Firm—James A. Geppert

[57] ABSTRACT

A minimum complexity vibration damper that integrates the function of structural components and reduced lag in a vibration damping system. This assembly utilizes pressure plate formations for spring seats and the configuration of the pressure plate for spring retention. The reactor plate or hub is designed to concentrate spring unit loading on the hub and away from other components of the assembly, thereby decreasing lag. A spring retainer plate may be utilized in conjunction with the hub and pressure plates.

3 Claims, 7 Drawing Figures

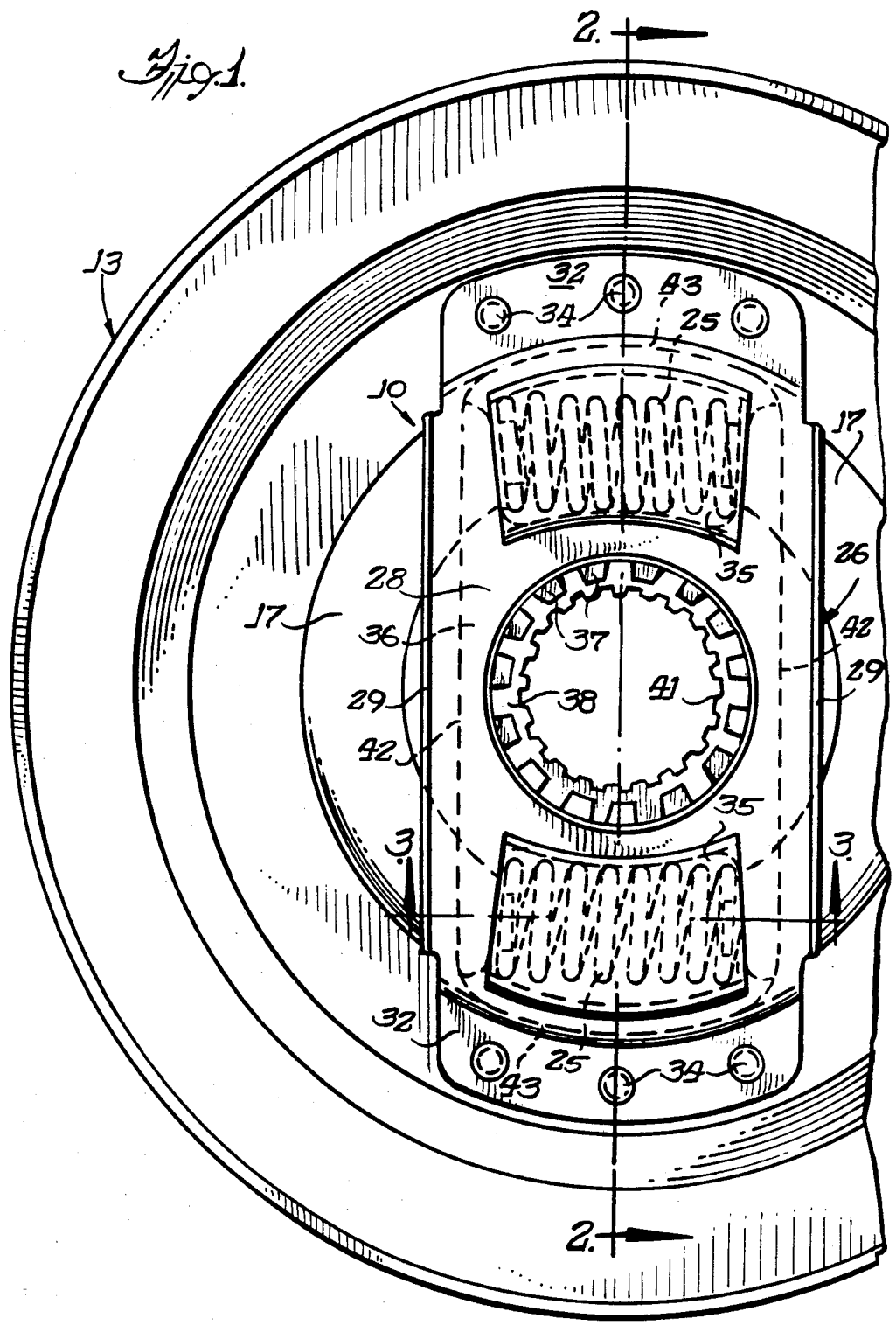

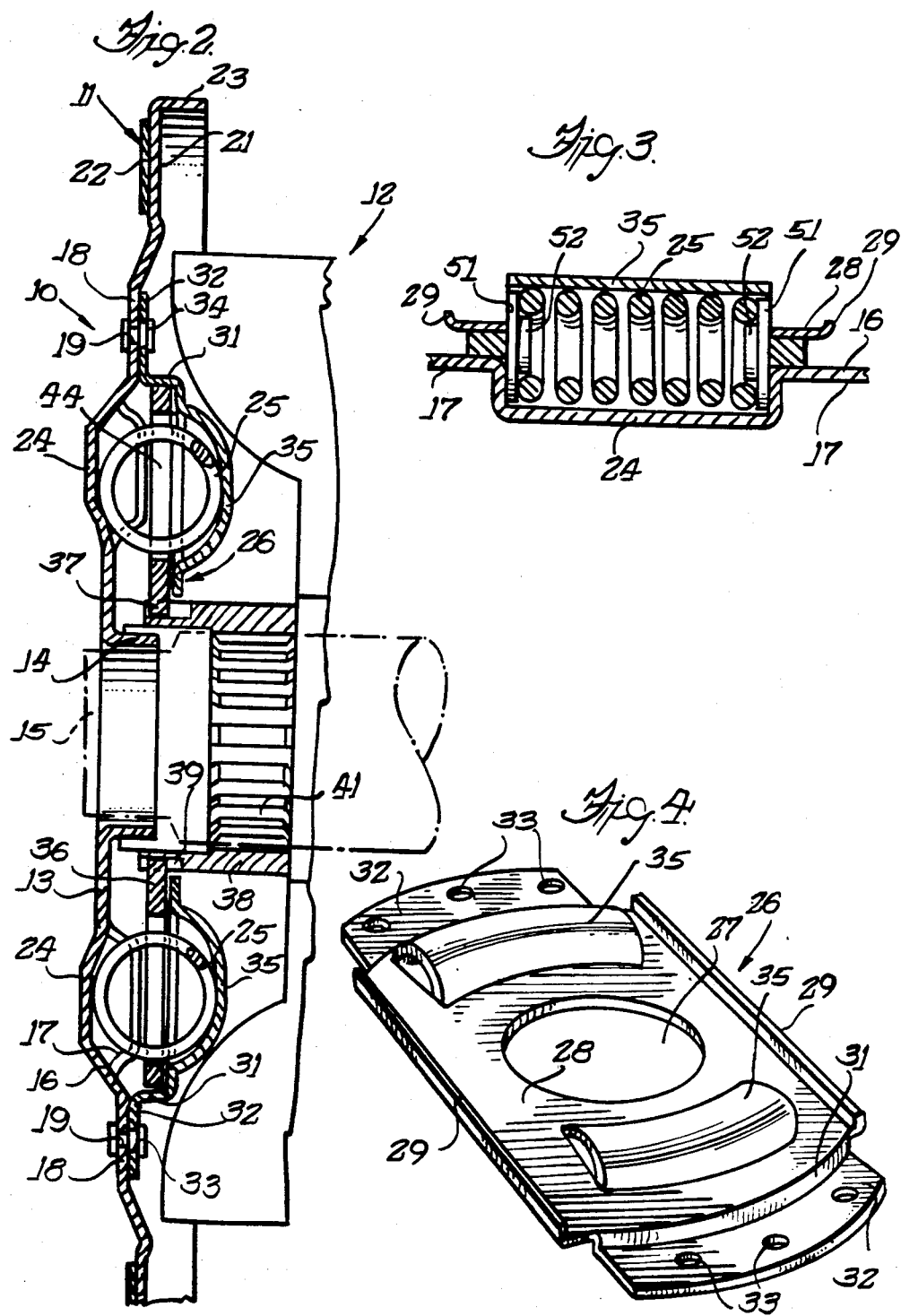

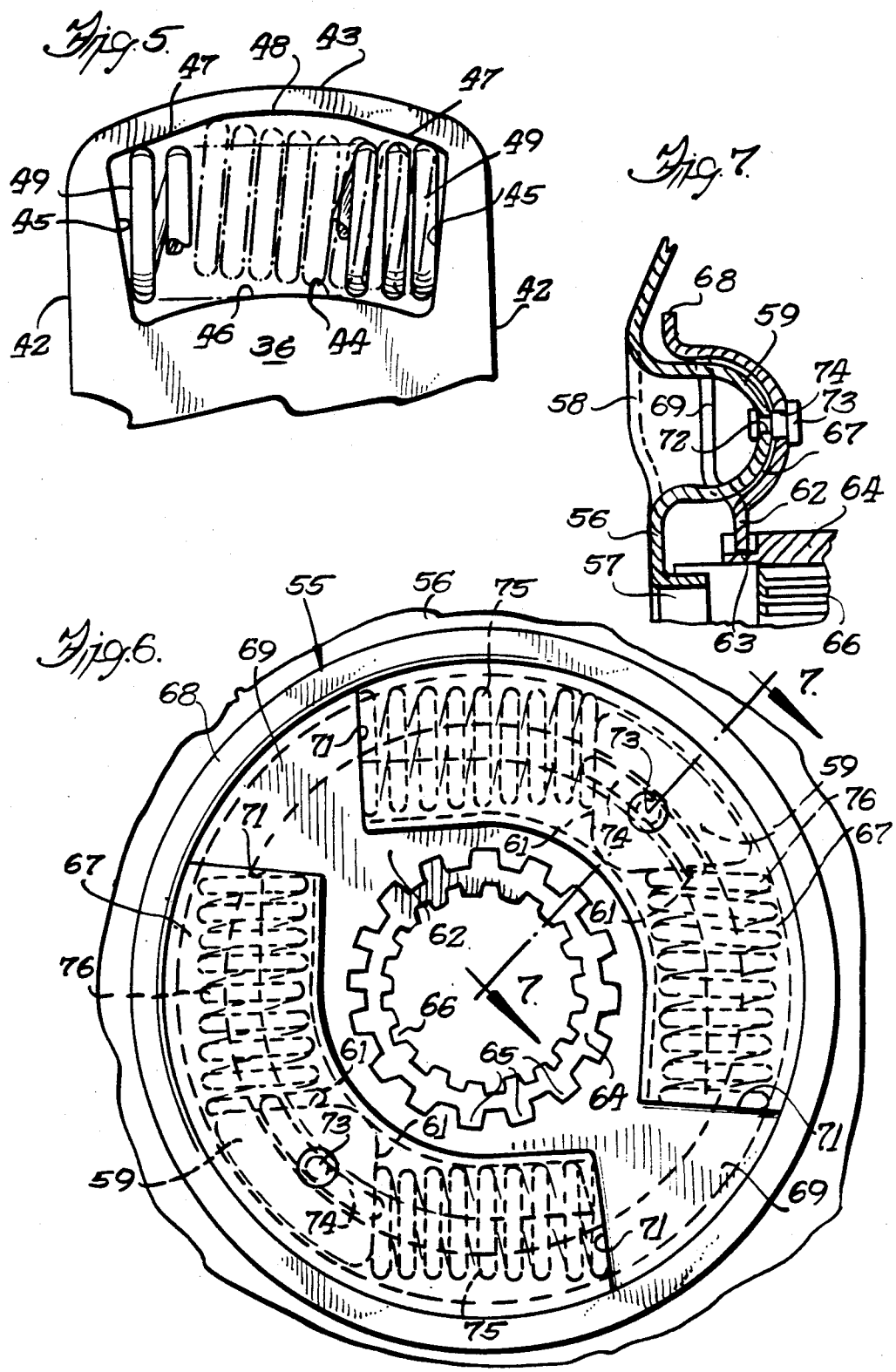

MINIMUM COMPLEXITY VIBRATION DAMPER

This is a division of application Ser. No. 564,151 filed Dec. 22, 1983 now U.S. Pat. No. 4,555,009.

BACKGROUND OF THE INVENTION

Vibration damper constructions for vehicle friction clutches are well known in the art for reducing drive line vibrations emanating from the vehicle engine which would otherwise cause undesirable characteristics, e.g., impact loads, pulsations, noises, etc. in the transmission and driveline during operation of the vehicle.

Conventional dampers are generally embodied in a clutch driven member assembly interposed between a driving member or vehicle engine and the vehicle transmission. Such an assembly usually includes a clutch driven plate and a spring retainer plate secured together in spaced relation to sandwich therebetween the radial flange of a hub connected to the transmission input shaft; the plates and hub flange having axially aligned sets of windows receiving damper springs. The clutch driven plate normally carries friction facings on its periphery that are adapted to be positioned between an engine flywheel and a clutch pressure plate.

Where the vibration damper is utilized in a lock-up clutch, the damper is interposed between a piston plate actuated by fluid pressure from operation of the torque converter and a hub operatively connected to the turbine hub and/or to the transmission input shaft. As shown in U.S. Pat. No. 4,188,805, the damper assembly includes a hub with at least two radial arms, drive input means connected to the piston plate and axially aligned with the hub arms, floating equalizers journalled on the hub and having oppositely disposed arms, and damper springs positioned between the hub arms and equalizer arms; the drive input means being located in the path of the damper springs.

The present invention provides a simplified vibration damper assembly adapted for use in either a vehicle friction clutch or a torque converter lock-up clutch.

SUMMARY OF THE INVENTION

The present invention comprehends the provision of a novel minimum complexity vibration damper for use in a vehicle clutch or other torsional coupling wherein the functions of the structural components are integrated so as to eliminate the need for one or both spring retainers. This assembly utilizes pressure or clutch plate formations for spring seats for the damper springs. Also, this configuration uses the form of the pressure or clutch plate for spring retention, thus eliminating the need for one spring retainer. This assembly requires a clutch or pressure plate, a hub plate, a retainer plate and the damper springs.

The present invention also comprehends the provision of a novel simplified vibration damper utilizing an integral hub and retainer plate along with a pressure or clutch plate. The configuration of these two parts provides the spring seats for the damper springs.

The present invention further comprehends the provision of a novel simplified vibration damper having a hub plate with a configuration to concentrate spring unit loading on the hub and away from the other components, thereby decreasing lag in the assembly.

Further objects are to provide a construction of maximum simplicity, efficiency, economy and ease of assembly and operation, and such other objects, advantages and capabilities as will later more fully appear and are inherently possessed thereby.

DESCRIPTION OF THE DRAWINGS

FIG. 1 is a partial rear elevational view of a vibration damper assembly embodying the present invention.

FIG. 2 is a cross sectional view taken on the line 2—2 of FIG. 1.

FIG. 3 is a cross sectional view taken on the line 3—3 of FIG. 2.

FIG. 4 is a perspective view of the spring retainer plate.

FIG. 5 is an elevational view of a portion of the hub plate utilized in the assembly of FIG. 1.

FIG. 6 is a partial rear elevational view of a second embodiment of vibration damper assembly.

FIG. 7 is a cross sectional view taken on the irregular line 7—7 of FIG. 6.

DESCRIPTION OF THE PREFERRED EMBODIMENTS

Referring more particularly to the disclosure in the drawings wherein are shown illustrative embodiments of the present invention, FIGS. 1 through 5 disclose a vibration damping assembly 10 utilized in a lock-up clutch 11 for a torque converter 12, which assembly provides a smaller damper profile providing an advantage when dealing with space limitations. The assembly includes a generally circular piston plate 13 having an inner axial flange 14 defining an opening receiving the end 15 of a transmission input shaft, an intermediate portion 16 having a pair of inwardly offset arcuate channels 17, an offset securing portion 18 with circularly arranged openings 19, an outer annular flat friction portion 21 having a friction facing 22 suitably secured thereto and terminating in an axial peripheral flange 23. The arcuate channels 17 are provided with a pair of diametrically oppositely disposed outwardly offset curved spring retainers or pockets 24 for a pair of damper springs 25,25.

A spring retainer plate 26 has a central opening 27 and a generally flat rectangular portion 28 defined by parallel edges 29,29, the ends of the plate terminating in axial flanges or offset portions 31,31 and radial mounting flanges 32,32 having openings 33 axially aligned with openings 19 for rivets or other suitable securing means 34 to secure the plates 13 and 26 together. The plate is provided with a pair of arcuate, outwardly offset spring retainers or pockets 35,35 aligned with the retainers or pockets 24 to encompass the damper springs 25.

A substantially rectangular hub or reactor plate 36 has a central opening with internal splines 37 receiving the outer splined surface 39 of a generally cylindrical barrel 38 having an internally splined passage 41 receiving the splined end 15 of the transmission input shaft. The hub plate has parallel side edges 42,42 and arcuate end edges 43,43 fitting within the arcuate offset portions 31 of the retainer plate 26. Each end of the hub plate contains a generally arcuate spring window 44 axially aligned with the spring retainers or pockets 24 and 35 of the piston plate and retainer plate, respectively. Each spring window has a pair of outwardly diverging flat ends or edges 45,45, an inner arcuate edge 46 and an outer edge consisting of outer inclined flat edge portions 47,47 connected by a central arcuate portion 48;

the end edges of the pockets 24 and 35 being outwardly diverging and generally aligned with the edges 45,45.

The angles of the inclined portions 47,47 are greater than the angles of the arcuate outer edges of the spring retainers 24 and 35 so that as torque is applied to the piston plate 13 in either direction of rotation, the piston plate and retainer plate pockets contact one end 49 of each damper spring to compress the spring. As the spring is compressed by the pockets of the plates and the opposite end edge 45 of the hub plate as shown in dotted lines, the outer corner of the spring does not ride on the inclined edge portion 47 reducing the friction lag in the damper operation. This action will continue until the outer corner of the spring engages the arcuate central portion 48 of the outer edge. As seen in FIG. 3, thrust buttons 51 having central raised portions 52 received within the end coils of the springs 25 are optionally used within the spring pockets of the plates.

FIGS. 6 and 7 disclose an alternate embodiment of low complexity vibration damper 55 eliminating the need for separate spring retainers. This embodiment utilizes a piston or pressure plate 56 having a central axial flange 57 defining a central opening for the transmission input shaft, a generally flat portion 58, an outer annular portion carrying a friction facing and an outer peripheral flange substantially identical to the showing in FIGS. 1 and 2. The flat portion 58 includes a pair of diametrically oppositely disposed inwardly offset and substantially triangular spring abutments 59 having outwardly diverging contact surfaces 61.

A generally circular hub or reactor plate 62 has a central splined opening 63 receiving exterior splines 65 on a generally cylindrical hub barrel 64 also having a central splined passage 66, and a pair of annular channels 67 extending for approximately 180° acting as a damper spring housing and terminating in a radial lip 68. The channels are separated by a pair of diametrically opposite inwardly offset straps 69 90° removed from the abutments and having outwardly diverging edges 71.

The channel 67 conformably receives the spring abutments 59, as seen in FIG. 7, with each abutment having a central opening 72 to receive one end of a guide or shoulder rivet 73 which also extends through an elongated arcuate slot 74 in the channel to limit relative rotation between the members. The rivets are headed at both ends to secure the members in their operative position. Two pairs of damper springs 75,75 and 76,76 are positioned within said channel between the spring abutments 59 and the offset straps 69. Only one pair of springs will be active in the drive direction while the opposite pair of springs will be active in the coast direction.

Although both of the above described assemblies are shown for use in a torque converter lock-up clutch having a piston or pressure plate 13 or 56, the assemblies are equally adaptable for use in a friction clutch of a vehicle manual transmission or in a torsional coupling between two axially aligned shafts. Obviously, the pressure plate would either be altered to provide a plate carrying friction facings at its periphery adapted to be positioned between a flywheel and pressure plate of a vehicle clutch assembly or provided with mounting means to be secured to a rotating flange of a drive shaft in a torsional coupling arrangement.

We claim:

1. A vibration damper assembly for a torque converter lock-up clutch, friction clutch or torsional coupling, comprising a pressure plate, a reactor plate, a generally cylindrical hub barrel operatively connected to a transmission input shaft, said reactor plate being directly connected to said hub barrel and having a pair of outwardly curved arcuate channels extending for approximately 180° acting as spring pockets and separated by a pair of diametrically opposed inwardly offset drive straps, said pressure plate being generally flat and provided wth a pair of diametrically opposed inwardly offset substantially triangular spring abutments 90° removed from said drive straps and projecting into said channels, and two pairs of oppositely disposed damper springs, said pressure plate and reactor plate forming the spring pockets enclosing said damper springs positioned between said spring abutments and drive straps, and said drive straps and spring abutments providing reaction surfaces contacting the ends of the springs.

2. A vibration damper assembly as set forth in claim 1, wherein said spring abutments are generally triangular with outwardly diverging spring contact surfaces, and said drive straps have outwardly diverging edges.

3. A vibration damper assembly for a torque converter lock-up clutch, friction clutch or torsional coupling, comprising a pressure plate, a reactor plate, a generally cylindrical hub barrel operatively connected to a transmission input shaft, said reactor plate being directly connected to said hub barrel and having a pair of outwardly curved arcuate channels acting as spring pockets and separated by a pair of diametrically opposed inwardly offset drive straps, said pressure plate being generally flat and provided with a pair of diametrically opposed inwardly offset drive straps, said pressure plate being generally flat and provided with a pair of diametrically opposed inwardly offset generally triangular spring abutments removed 90° from said drive straps and projecting into said channels, said channels having a pair of diametrically oppositely disposed elongated arcuate slots therein, a shoulder rivet projecting through each slot and secured to the aligned spring abutment, and two pairs of oppositely disposed damper springs positioned between said spring abutments and drive straps, said pressure plate and reactor plate forming said spring pockets enclosing said damper springs, said spring abutments having outwardly diverging spring contact surfaces and said drive straps having outwardly diverging edges providing reaction surfaces contacting the ends of the springs.

* * * * *